C. KAY.
OILING CUP.
APPLICATION FILED JUNE 28, 1920.

1,356,452. Patented Oct. 19, 1920.

WITNESS:

Charles Kay
INVENTOR
BY Victor J. Evans
ATTORNEY

UNITED STATES PATENT OFFICE.

CHARLES KAY, OF DETROIT, MICHIGAN.

OILING-CUP.

1,356,452.

Specification of Letters Patent.  Patented Oct. 19, 1920.

Application filed June 28, 1920. Serial No. 392,156.

*To all whom it may concern:*

Be it known that I, CHARLES KAY, a subject of the King of Great Britain, residing at Detroit, in the county of Wayne and State of Michigan, have invented new and useful Improvements in Oiling-Cups, of which the following is a specification.

This invention relates to oil cups primarily designed for use in conjunction with loose pulleys.

In the old method of oiling loose pulleys which are provided with an oil opening in the hub, it has been found that just as soon as the pulley starts to move around the oil runs out of the hole or openings in the hub and wastes, by the time the pulley reaches its ordinary speed every drop of oil has been thrown from the opening and wasted, with the exception of a very small quantity that adhered to the shaft when the pulley started to move, and which is quite insufficient to keep the pulley properly lubricated. Consequently the pulley will heat and grind in very short order.

Where use is made of a straight oil cup, the oil in said cup, while the pulley is in motion, is maintained in the top part of the cup, also having a tendency to draw from the opening in the hub or the pulley whenever a quantity of oil has entered the opening while the pulley was at rest, and obviously there is no oil whatever conveyed to the bearing or shaft from the oil cup while the pulley is in motion. Again, when the pulley is stopped and the oil cup arranged at the top of the hub the oil runs from the cup through the bearing of the pulley and on the floor as waste. The above is the direct cause of the wearing, trouble and expense of all fast running pulleys, as they do not get enough oil from the cup and soon have to be rebushed.

It is therefore the object of this invention to provide an oil cup having an angularly disposed shank or stem which is associated with the hub of the pulley in a manner to eliminate the foregoing objections of the present day method of oiling said pulley, the invention also embodying means to prevent choking or stopping of the oil passage from the cup to the pulley bearings.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:—

Figure 1:
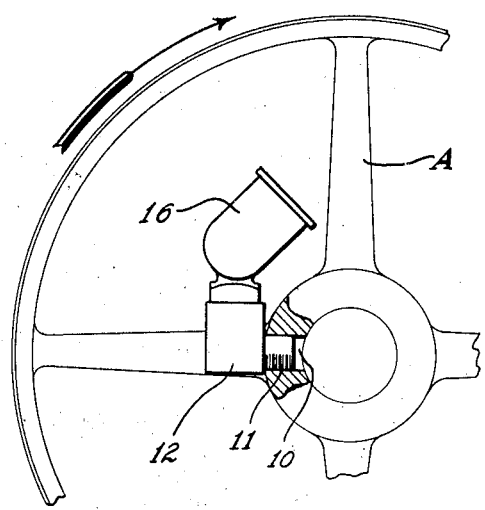
Figure 1 is a side elevation of the cup partly in section showing the same associated with the pulley.
Figure 3:
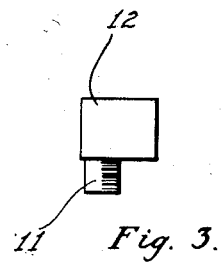
Fig. 3 is a view of the bushing removed from the hub of the pulley.
Figure 2:
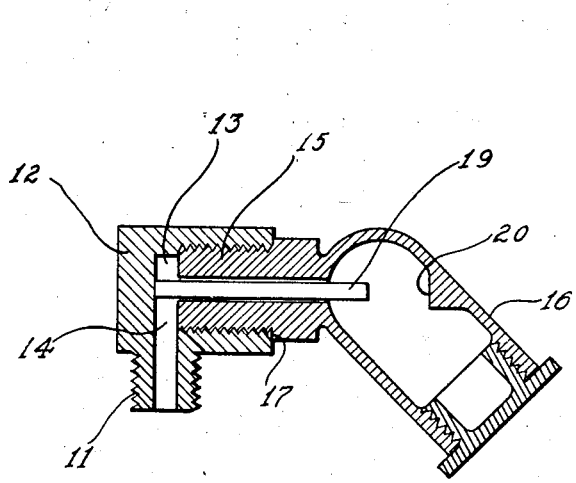
Fig. 2 is an enlarged sectional view taken through the cup and removed from the pulley.
Figure 4:
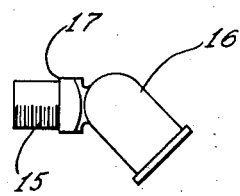
Fig. 4 is a detailed view of the cup separated from the bushing.

Referring to the drawings in detail, A indicates generally a loose pulley of the usual well known construction, the hub of which is provided with an opening at 10. Arranged within this opening is the threaded extremity 11 of a bushing 12 which has a right angularly disposed hollow portion 13 which communicates with the bore 14, the off-set portion 13 being also interiorly threaded to accommodate the threaded extremity or shank 15 of the oil cup 16. As shown the shank 15 is disposed at an angle with respect to the cup 16, the shank 15 being provided with a shoulder 17 that bears against the bushing 12. By reason of this construction and arrangement of parts, it will be apparent that the oil is at all times fed to the shaft and bushing of the pulley irrespective of the speed of the pulley as the oil is maintained at the bottom of the cup and forcing itself through the bushing 12.

For the purpose of preventing the oil from feeding too fast from the cup 16 and also preventing the passage from being choked or otherwise obstructed, I make use of a sliding pin 19 which is arranged to reciprocate through the shank 15 of the cup. The pin is limited in its movement by one pawl of the bore 14, and by means of a projection 20 arranged within the cup 16. The pin is only moved while starting or stopping of the pulley and serves to keep the passage unobstructed and also regulates the flow of the oil through the passage to the bushings or hub of the pulley.

While it is believed that from the foregoing description, the nature and advantages of the invention will be readily apparent I desire to have it understood that I do not limit myself to what is herein shown and described and that such changes may be resorted to when desired as fall within the scope of what is claimed.

What I claim is:

In combination, a bushing having right angularly disposed branches, one of said branches being exteriorly threaded, the other being interiorly threaded, an oil cup, a threaded nipple forming part of said cup, and obliquely disposed relatively thereto, said nipple being threaded into the adjacent branch of the bushing, a pin slidably fitted in said nipple and limited in its movement in one direction by said bushing, and a shoulder projecting inwardly from said cup to limit the movement of the pin in the opposite direction.

In testimony whereof I affix my signature.

CHARLES KAY.